Figure 6:
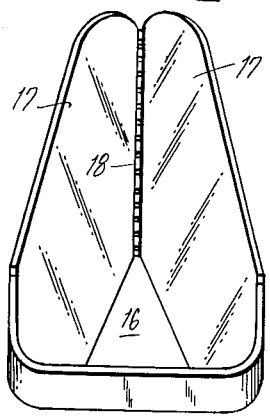

Dec. 5, 1961  E. PROCHAZKA  3,011,392
KALEIDOSCOPE
Filed May 14, 1958  2 Sheets-Sheet 1
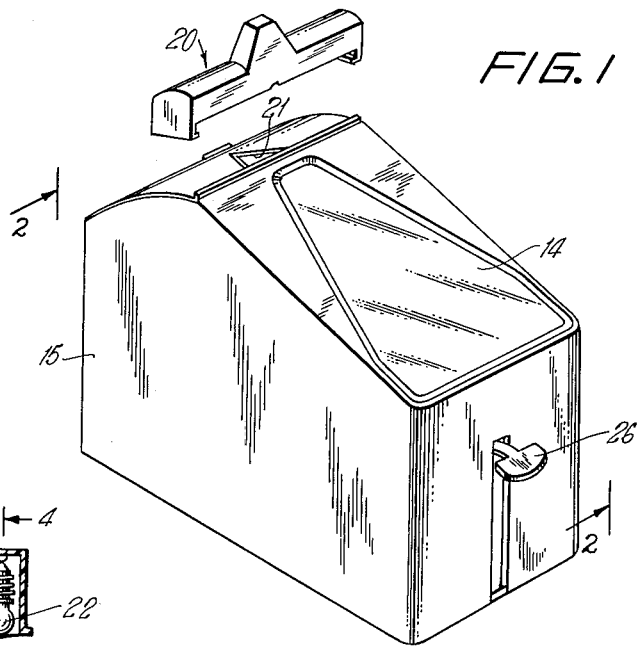
FIG. 1
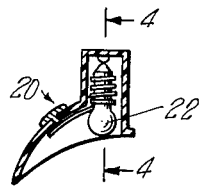
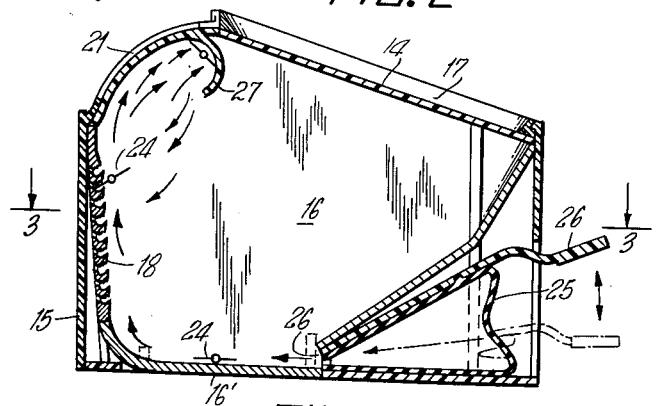
FIG. 2
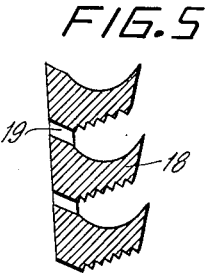
FIG. 5
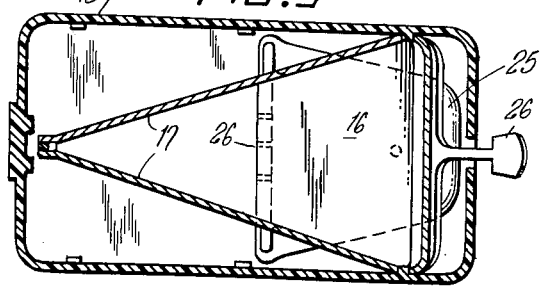
FIG. 3
FIG. 4
INVENTOR
EDWARD PROCHAZKA
ATTORNEY Dec. 5, 1961  E. PROCHAZKA  3,011,392
KALEIDOSCOPE
Filed May 14, 1958  2 Sheets-Sheet 2

INVENTOR
EDWARD PROCHAZKA
BY
ATTORNEY

United States Patent Office 3,011,392
Patented Dec. 5, 1961

3,011,392
KALEIDOSCOPE
Edward Prochazka, 328 E. 73rd St., New York, N.Y.
Filed May 14, 1958, Ser. No. 735,166
4 Claims. (Cl. 88—15)

My invention relates to optical instruments known as kaleidoscopes which produce by the use of mirrors an infinite variety of images of preferably multicolored and differently shaped particles.

In known kaleidoscopes the said particles are confined in a subtantially flat compartment formed by two parallel plates of which at least one is transparent and the changing arrangement of said particles within said flat compartment is being viewed through an adjoining viewing chamber which includes a pair of mirrors in wedge-shaped relation.

The object of my invention is to improve the kaleidoscopic effect of such instruments. This is achieved according to my invention by permitting the said particles to be displaced three-dimensionally that is spatially whereby a much greater variety of patterns and more impressive and pleasant images thereof are achieved.

According to my invention I use in my kaleidoscope particles which are relatively light and may be easily displaced for example by an air flow said particles being placed directly into the viewing chamber containing at least one pair of converging mirrors, and I arrange between the converging edges of said mirrors a plurality of suitable for example hooklike or toothlike catch members which seize and hold particles, when the same are being agitated within said viewing chamber, at different levels above the bottom of said chamber.

The said and other objects of my invention will be more fully understood from the following specification when read with the accompanying drawing which illustrates several embodiments of my new kaleidoscope. In the drawing—

Figure 7:
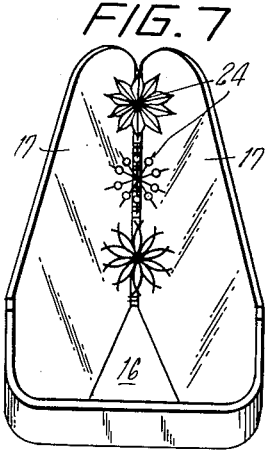
Figure 8:
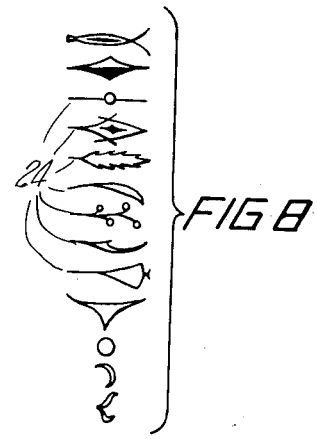
Figure 9:
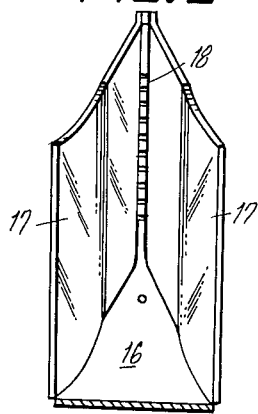
Figure 10:
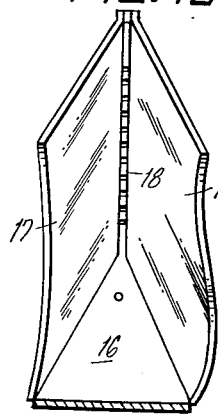
Figure 12:
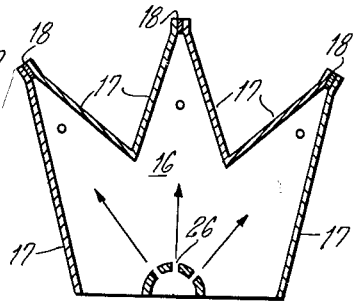
Figure 11:
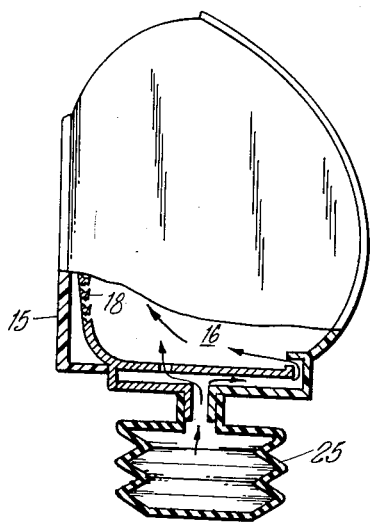

FIG. 1 is a perspective view of one embodiment of my kaleidoscope,

FIG. 2 is a vertical cross section thereof as indicated by the arrows in FIG. 1, FIG. 3 is a horizontal cross section thereof along line 3—3 in FIG. 2, FIG. 4 is a sectional view of the illuminating device on line 4—4 in FIG. 2, FIG. 5 is an enlarged longitudinal sectional view of an element referred to in detail in the specification, FIGS. 6 and 7 are perspective views into the viewing chamber of the kaleidoscope, FIG. 8 illustrates by way of example a plurality of differently shaped particles used within the viewing chamber of the kaleidoscope, FIGS. 9 and 10 are perspective views into two additional embodiments of said viewing chamber, FIG. 11 shows partly in vertical cross section, another embodiment of my kaleidoscope, and FIG. 12 is a horizontal cross section through an amended viewing chamber of my kaleidoscope.

The same reference numerals indicate the same or equivalent parts in all figures of the drawing.

The embodiment illustrated in FIGS. 1 through 7 comprises a box or casing 15 preferably made of plastic material which encloses a viewing chamber 16 and is provided in its top wall with a window 14 permitting an observer to inspect the chamber. This chamber is substantially wedge-shaped being enclosed by two converging and substantially vertical side walls 17 mirrored or otherwise reflecting within said chamber, a horizontal cross section therethrough corresponding to an isosceles triangle as appearing from FIG. 3. The said mirrored side walls 17 are preferably so arranged that their converging edges are slightly reclining outwardly from said chamber as shown in FIG. 12 for reasons which will be fully explained hereinafter. Between the converging edges of the side walls 17 is mounted a longitudinal series of superimposed arrestor projections or catch elements 18 which may be spaced from each other and separated by channels 19. The said catch elements 18 may be integrated into a rack as shown in FIGS. 2 and 5. The viewing chamber 16 may be lightened by an illuminating device 20 which is seated above an opening 21 of the casing 15 and which comprises a bulb 22 and electric batteries 23.

Within the viewing chamber 16 is a plurality of light particles 24 preferably of different colors and shapes of the type illustrated by way of example in FIG. 8, said particles being light enough to be spatially displaced within the chamber 16 either by shaking the casing 15 or by an air flow introduced into said chamber whereby a portion of said particles 24 is caught and held by the said catch members 18 as indicated in FIGS. 2 and 7.

In the embodiment illustrated in FIGS. 1 to 4 the said particles 24 are agitated by an air flow created by bellows 25 operated by the key 26.

The air compressed by bellows 25 enters through one or more openings 26 into the viewing chamber 16 and the air flowing along the walls of the said chamber raises the particles 24 from the bottom 16' as indicated by the arrows in FIG. 2 until they reach a deflector or baffle plate 27 which returns the said particles to the catch members 18 situated between the converging edges of the mirrored side walls 17. These edges diverge slightly outwardly from the viewing chamber 16 so that the reflective particles 24 will more safely contact and thus be more securely retained by said catch members 18. The air channels 19 between each pair of said catch members 18 permit air to flow out of chamber 16 thus causing particles 24 to be drawn deeper between the adjacent catch members 18 and thus facilitating retention thereof.

The particles 24 are removed from the catch members 18 and the instrument is prepared for other kaleidoscopic images by shaking the casing 15 until the particles 24 reassemble on the bottom 16' of the casing.

It will be well understood that the multi-shaped and multi-colored particles 24, partly resting on the bottom wall 16' and partly held by said catch members 18 in spatial locations, will cause a multiplicity of varied images in the reflecting walls 17 and thus create a kaleidoscopic effect which is more impressive and pleasant than the effect achieved by kaleidoscopes known up to this time.

To increase the kaleidoscopic effect the mirrored side walls 17 of the viewing chamber 16 may be corrugated, or concave and/or convex shaped as shown in FIGS. 9 and 10.

In the embodiment illustrated in FIG. 11 the bellows 25 are arranged below the bottom wall 16' of the viewing chamber 16 and the arrows indicate how the compressed air agitating the particles 24 enters said chamber.

FIG. 12 shows a horizontal cross section through the viewing chamber 16 of still another embodiment of my new kaleidoscope. In this embodiment more than one pair of converging mirrored walls 17 is being used to form communicating sections in the viewing chamber 16 and thus the kaleidoscopic effect is being multiplied.

While specific embodiments of my invention have been shown and described in detail to illustrate the application of the principles of my invention, it will be understood that the same may be otherwise embodied without departing from such principles and without avoiding the scope of my appended claims.

What I claim as my invention is:

1. In a kaleidoscope comprising an exterior casing, means defining a closed chamber having a viewing window and top, bottom, side and end walls, means operable from a position adjacent to one of said end walls for projecting a current of air in proximity to said bottom wall and toward the opposite end wall, means providing reflecting surfaces converging toward said opposite end wall and extending from said top wall to said bottom wall confining said air current laterally of said chamber, a plurality of colored particles confined within the chamber between said reflecting surfaces and normally resting on said bottom wall, a longitudinal series of vertically spaced arrestor projections confined between the converging reflector surfaces and baffle means positioned above said arrestor projections for deflecting the colored particles toward said projections when the current of air is introduced into said chamber.

2. A kaleidoscope according to claim 1, wherein the said longitudinally disposed series of arrestor projections are integrated into a rack.

3. A kaleidoscope according to claim 1, wherein the superposed arrestor projections are longitudinally spaced leaving air channels therebetween to permit air to escape from the casing and to partially draw particles into said channels.

4. A kaleidoscope according to claim 1, wherein converging edges of a plurality of reflecting surfaces are interconnected by means of a longitudinal series of horizontally spaced arrestor projections.

References Cited in the file of this patent

UNITED STATES PATENTS

| | | |
|---|---|---|
| 416,092 | Clawson | Nov. 26, 1889 |
| 862,438 | Boehm | Aug. 6, 1907 |
| 877,645 | Hare | Jan. 28, 1908 |
| 1,787,388 | McLean | Dec. 30, 1930 |
| 1,800,673 | Bruckner | Apr. 14, 1931 |
| 2,494,239 | Grow | Jan. 10, 1950 |

FOREIGN PATENTS

| | | |
|---|---|---|
| 8,909 | Great Britain | of 1893 |
| 395,796 | Great Britain | July 27, 1933 |
| 408,743 | Italy | Jan. 9, 1945 |
| 835,531 | Germany | Apr. 3, 1952 |